US007616408B2

(12) United States Patent
Choi et al.

(10) Patent No.: US 7,616,408 B2
(45) Date of Patent: Nov. 10, 2009

(54) HARD DISK DRIVE CONNECTING A FLEXIBLE PRINTED CIRCUIT AND ACTUATOR HAVING VERTICAL MATING

(75) Inventors: Byoung-gyou Choi, Suwon-si (KR); Ki-tag Jeong, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 375 days.

(21) Appl. No.: 11/320,952

(22) Filed: Dec. 30, 2005

(65) Prior Publication Data

US 2006/0164762 A1 Jul. 27, 2006

(30) Foreign Application Priority Data

Dec. 31, 2004 (KR) .................... 10-2004-0117938

(51) Int. Cl.
*G11B 5/55* (2006.01)
*G11B 5/48* (2006.01)

(52) U.S. Cl. ................. 360/264.2; 360/245.9

(58) Field of Classification Search .............. 360/264.2, 360/265.7, 266.3, 271.9, 245.9, 123.36, 245.2, 360/245.8, 244.1; 720/685; 174/135; 248/65

See application file for complete search history.

(56) References Cited

U.S. PATENT DOCUMENTS 5,495,377 A 2/1996 Kim ........................ 360/264.2

| 5,680,277 A | 10/1997 | Bonn et al. ............... 360/264.2 |
| 6,031,693 A * | 2/2000 | Takahashi et al. ........ 369/13.17 |
| 7,227,725 B1 * | 6/2007 | Chang et al. ............. 360/264.2 |

FOREIGN PATENT DOCUMENTS

| JP | 10-269720 | 9/1998 |
| JP | 2003-017166 | 1/2003 |
| JP | 2004-039674 | 2/2004 |
| KR | 2002-0001843 | 1/2002 |
| KR | 10-0445491 | 8/2004 |

OTHER PUBLICATIONS

Online Oxford English Dictionary, "mate" (Nov. 9, 2008).*
Korean Intellectual Property Office Notice to Submit Response Issued on May 26, 2006.

\* cited by examiner

*Primary Examiner*—Julie Anne Watko
(74) *Attorney, Agent, or Firm*—Staas & Halsey LLP

(57) ABSTRACT

A hard disk drive (HDD) with an efficient connection between a flexible printed circuit and an actuator arm. The structure includes a flexible printed circuit having the flexible printed circuit and a stiffener for supporting the flexible printed circuit, and an actuator arm to which the flexible printed circuit is connected. An alignment hole, an alignment pin inserted into the alignment hole, a guide groove having one opened side, and a guide protrusion fitted into the guide groove are formed in the flexible printed circuit and the actuator arm, and the alignment hole and the alignment pin are fixed to each other through a soldering process.

8 Claims, 6 Drawing Sheets

HARD DISK DRIVE CONNECTING A FLEXIBLE PRINTED CIRCUIT AND ACTUATOR HAVING VERTICAL MATING

CROSS-REFERENCE TO RELATED APPLICATIONS

This application claims the priority benefit of Korean Patent Application No. 10-2004-0117938, filed on Dec. 31, 2004, in the Korean Intellectual Property Office, the disclosure of which is incorporated herein in its entirety by reference.

BACKGROUND OF THE INVENTION

1. Field of the Invention

Embodiments of the present invention relate to a hard disk drive (HDD), and more particularly, to structures and methods for connecting a flexible printed circuit and an actuator arm in an HDD, which can improve the productivity of a connecting process thereof over conventional processes.

2. Description of the Related Art

HDDs are auxiliary memory devices for computing devices that can reproduce/record data from/to a disk of the HDD by using a read/write head.

FIG. 1 illustrates a conventional HDD, and FIG. 2 illustrates an exploded perspective view of a conventional actuator.

Referring to FIGS. 1 and 2, a HDD may include at least one or more data storing disks 20, a spindle motor 30 installed on a base plate 10 to rotate the disk 20, and an actuator 40 having a read/write head 41 for reproducing/recording data from/on the disk 20.

The disks 20 may be installed to be spaced apart from one another by a predetermined interval and to be rotatable by the spindle motor 30.

The actuator 40 may be installed to be rotatable on a pivot 47 provided on the base plate 10, and may include an actuator arm 46 having at its center portion a pivot hole 48 for rotatably connecting the actuator arm 46 to the pivot 47. A suspension 44 is installed at one end portion of the actuator arm 46 to elastically bias a slider 42, mounting the read/write head 41, toward a surface of the disk 20. A corresponding voice coil motor (VCM) 50 may be provided in the actuator 40 to supply a driving force for rotating the actuator arm 46. Here, the voice coil motor 50 may have a VCM coil 56 connected to a rear end portion 57 of the actuator arm 46, with magnets 53 and 54 spaced apart from the VCM coil 56 by a predetermined interval.

In this conventional HDD, during the data reproducing/recording operation, a lift force caused by the rotation of the disk 20 and the elastic force generated by the suspension 44 apply to the slider 42 mounting the read/write head 41. Accordingly, the slider 42 can maintain its lift state at a constant height from a surface of the disk 20, through the resultant force of the lift and elastic forces. The head 41 mounted on the slider 42 can then accordingly reproduce/record data from/to the disk 20 while maintaining the constant height from the rotating disk 20.

In small mobile HDDs a flexible printed circuit is connected to the actuator arm 46, as will now be described with reference to FIG. 3.

FIG. 3 illustrates a conventional flexible printed circuit connected to an actuator arm of an HDD, as discussed in U.S. Pat. No. 5,495,377.

Referring to FIG. 3, the conventional flexible printed circuit 60 has alignment holes 61 and 62 for connecting the circuit 60 to an actuator arm. A corresponding actuator arm has alignment pins formed to correspond to the alignment holes 61 and 62. The alignment pins connected through the alignment holes 61 and 62, such that the flexible printed circuit 60 and the actuator arm can be aligned. Thereafter, the connected portions of the flexible printed circuit 60 and the actuator arm are soldered. In this manner, the flexible printed circuit 60 is fixed to the actuator arm.

In this conventional aligning method, in order to fix the flexible printed circuit 60 to the actuator arm, at least two alignment members and corresponding soldering processes are necessary. However, it is not easy to perform the aligning and soldering processes in such small HDDs due to a limited space within the small HDD. Accordingly, there is a loss in productivity in the connection process of the flexible printed circuit 60 and the actuator arm, i.e., if an alternative connection process could be instituted productivity may actually be increased.

One alternative is discussed in U.S. Pat. No. 5,680,277, which discusses connecting a flexible printed circuit to an actuator arm by using a screw.

However, this use of such a screw, similarly, cannot fundamentally improve productivity in the connection process of the flexible printed circuit and the actuator arm because of the delays generated from installing the screw.

Accordingly, there is a desire for an improved connection technique for efficiently connecting a flexible printed circuit to an actuator arm in an HDD.

SUMMARY OF THE INVENTION

Embodiments of the present invention include an improved structure and method for efficiently connecting a flexible printed circuit and an actuator arm of an HDD, thereby making it possible to improve productivity.

To achieve the above and/or other aspects and advantages, embodiments of the present invention include a hard disk drive, including a flexible printed circuit having a stiffener, to support the flexible printed circuit, and a first guide, and an actuator, controlling rotatable movement of a read/write head, having a second guide to horizontally or slideably mate with the first guide, wherein, in addition to the horizontal or slideable mating of the first and second guides, an alignment hole and an alignment pin are also used to vertically mate the flexible printed circuit and the actuator.

The alignment hole and the alignment pin may be fixed to each other with solder. Further, the second guide may have a protrusion for mating with a recess of the first guide. Here, the recess may be concave shaped.

The alignment hole and the first guide, as a groove, may be included with the stiffener. The alignment hole may also be along a central portion of the stiffener and the first guide may be along one end portion of the stiffener.

The alignment pin and the second guide, as a protrusion, may be included in the actuator arm. Further, the actuator arm may have a molding and the second guide, as a protrusion, and the alignment pin may be included in a body with the molding.

The alignment pin may be formed within the actuator arm through a press-in process. In addition, a soldering pad may be provided around the alignment hole.

To achieve the above and/or other aspects and advantages, embodiments of the present invention include a hard disk drive method connecting a flexible printed circuit to an actuator arm of a hard disk drive, the actuator for controlling rotatable movement of a read/write head, and the flexible printed circuit having a stiffener supporting the flexible printed circuit, the method including aligning the flexible printed circuit and the actuator arm by vertically mating an alignment pin with an alignment hole and horizontally or slideably mating a first guide with a second guide, and fixing the flexible printed circuit to the actuator arm.

The alignment hole and the first guide, as a groove, may be included in the stiffener. The alignment hole may also be included along a center portion of the stiffener and the first guide may be included along one end portion of the stiffener.

The alignment pin and the second guide, as a protrusion, may be included in the actuator arm. Here, a molding of the actuator arm and the second guide may be formed in a body. In addition, the method may include soldering a soldering pad provided around the alignment hole to perform the fixing of the flexible printed circuit to the actuator arm.

The soldering pad and the alignment pin may be soldered to perform the fixing of the flexible printed circuit to the actuator arm.

To achieve the above and/or other aspects and advantages, embodiments of the present invention include a connection system, for an actuator and flexible printed circuit of a hard disk drive, including a first guide with the flexible printed circuit, and a second guide to horizontally or slideably mate with the first guide, wherein, in addition to the horizontal or slideable mating of the first and second guides, an alignment hole and an alignment pin are also connectable to vertically mate the flexible printed circuit and the actuator.

To achieve the above and/or other aspects and advantages, embodiments of the present invention include a connection system, for an actuator and flexible printed circuit of a hard disk drive, including a concave recess with the flexible printed circuit, and a projection to horizontally or slideably mate with the concave recess, whereby an alignment hole and an alignment pin are connectable to vertically mate the flexible printed circuit and the actuator.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
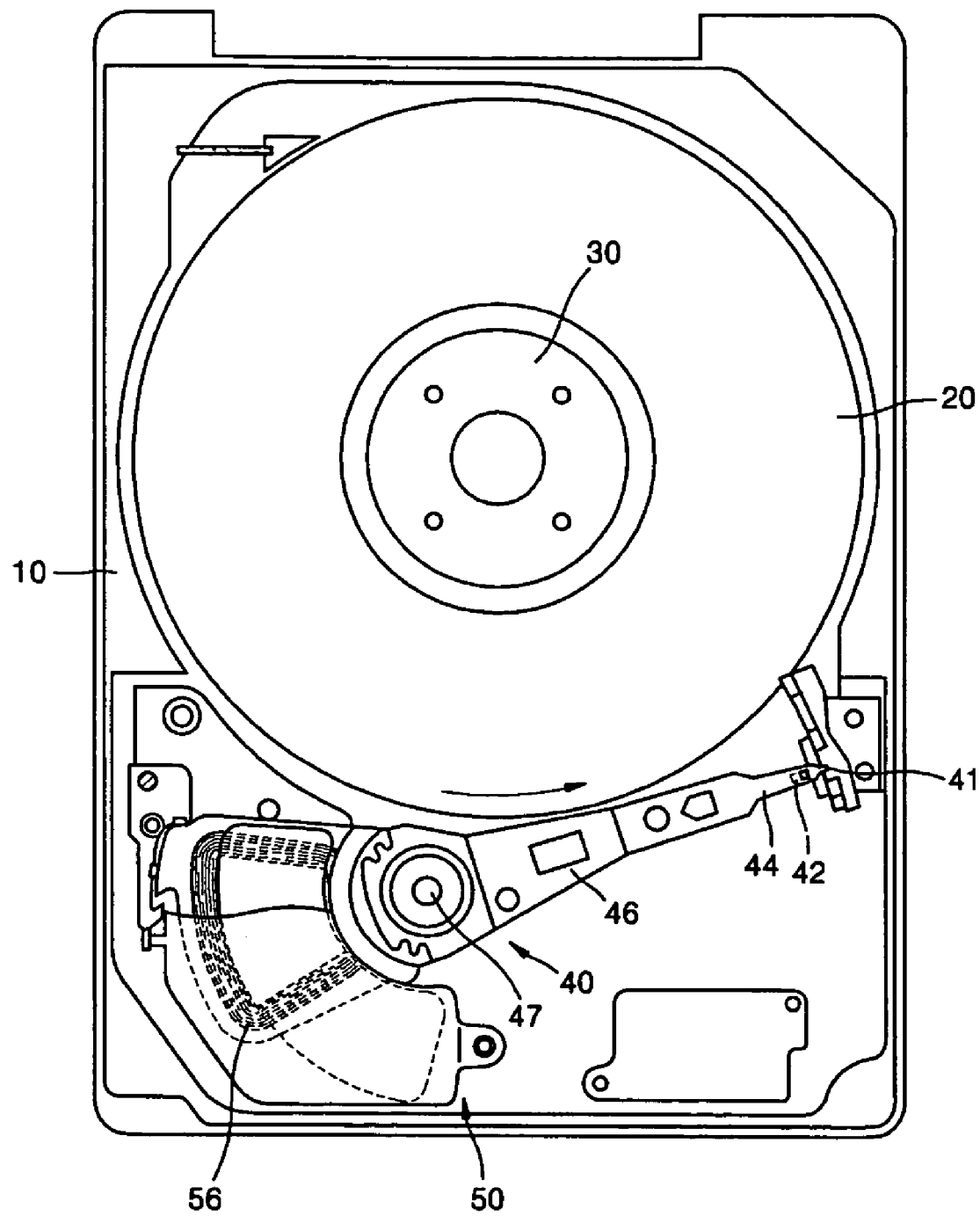
FIG. 1 illustrates a conventional hard disk drive (HDD)
Figure 2:
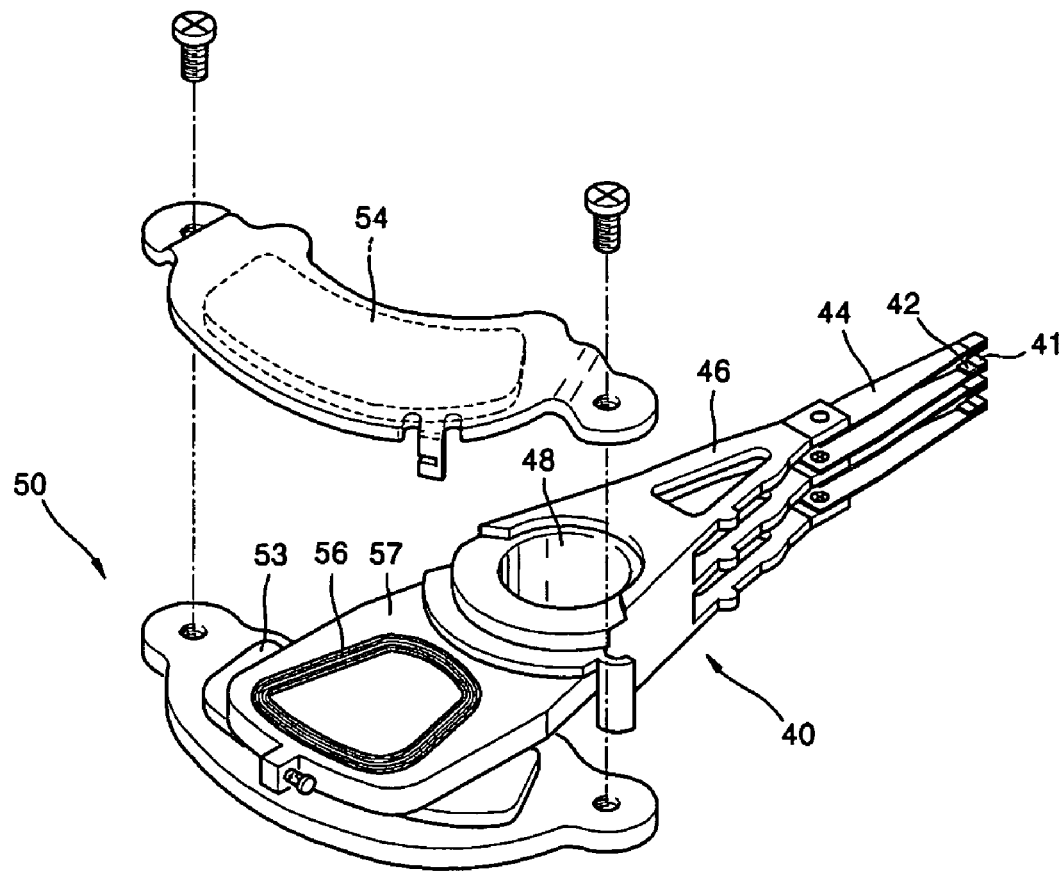
FIG. 2 illustrates an exploded perspective view of a conventional actuator.
Figure 3:
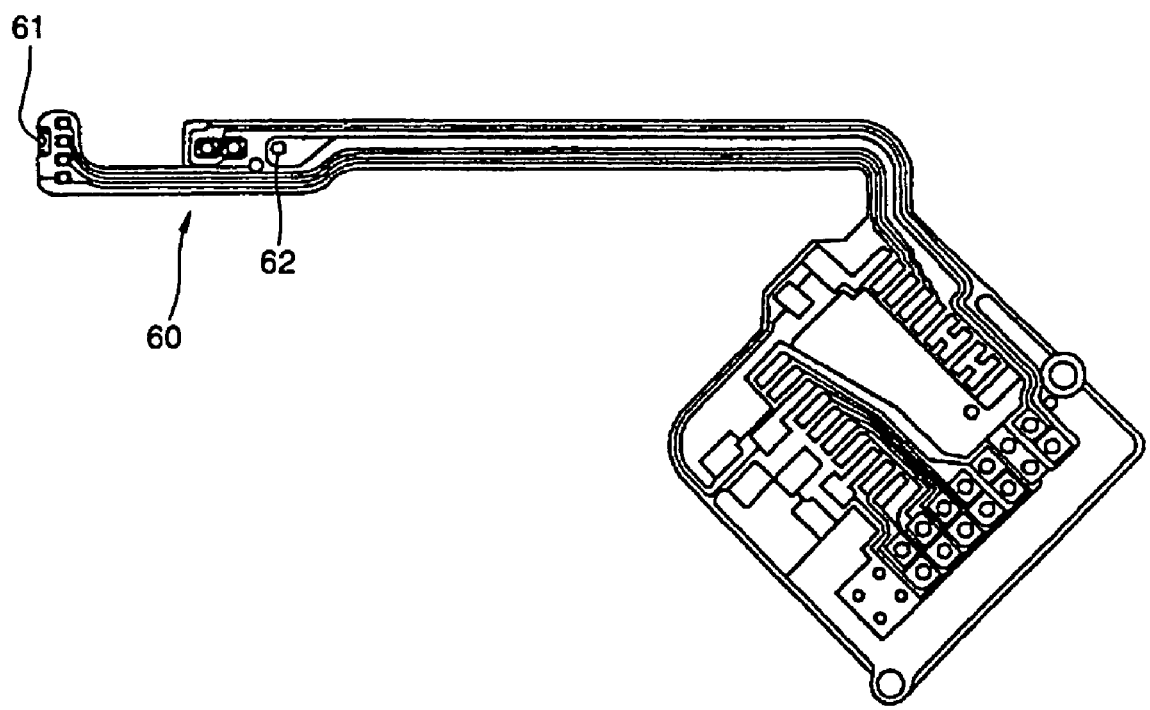
FIG. 3 illustrates a conventional flexible printed circuit connected to an actuator arm of an HDD.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 4:
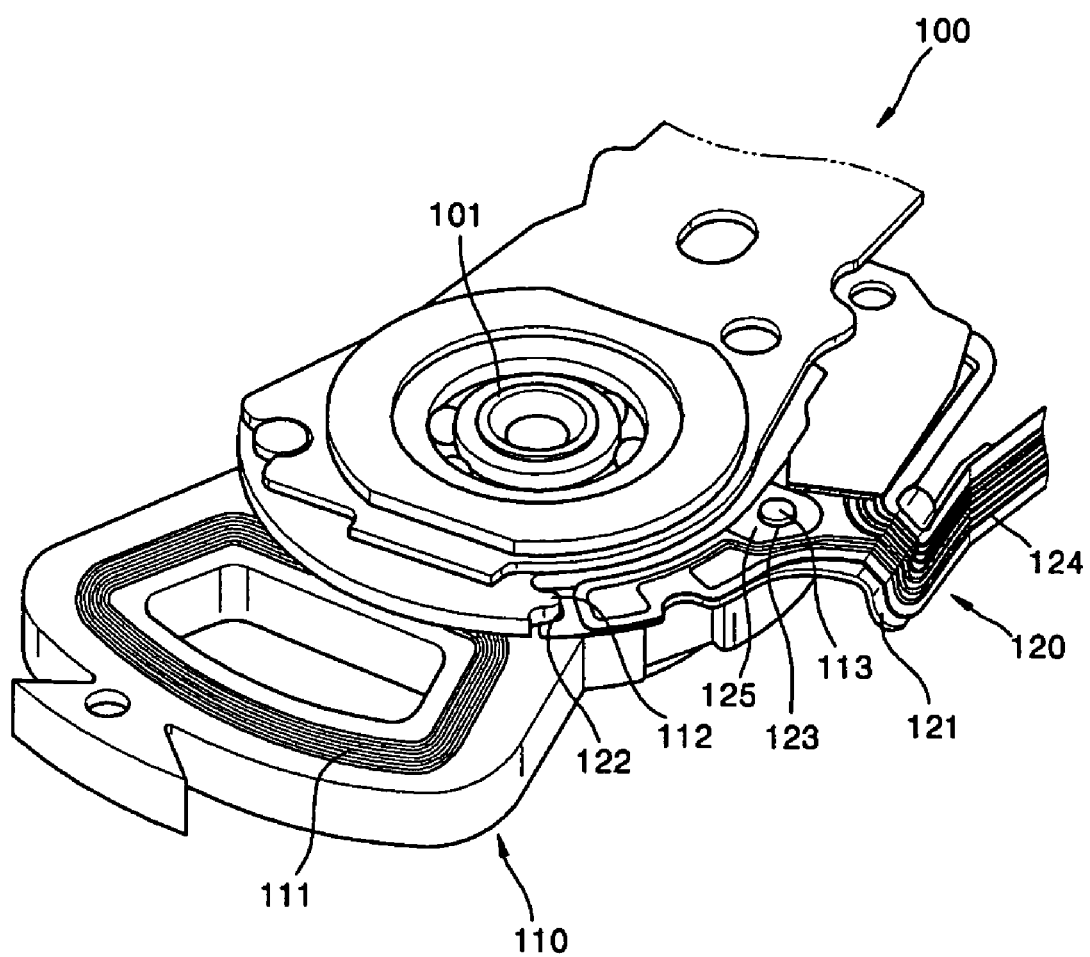
FIG. 4 illustrates a flexible printed circuit and an actuator arm in an HDD, according to an embodiment of the present invention.
Figure 5:
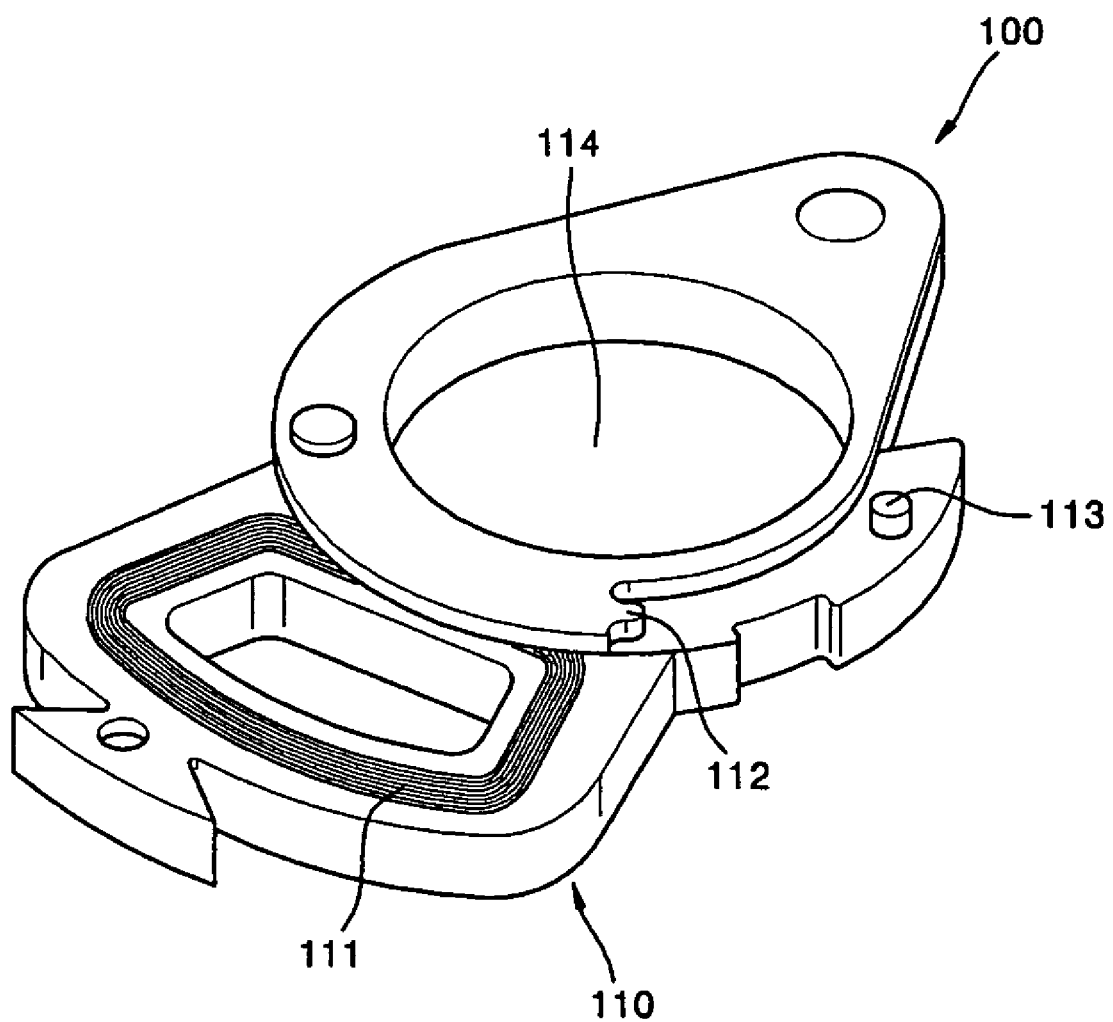
FIG. 5 illustrates a molding of an actuator arm, such as that shown in FIG. 4, according to an embodiment of the present invention.
Figure 6:
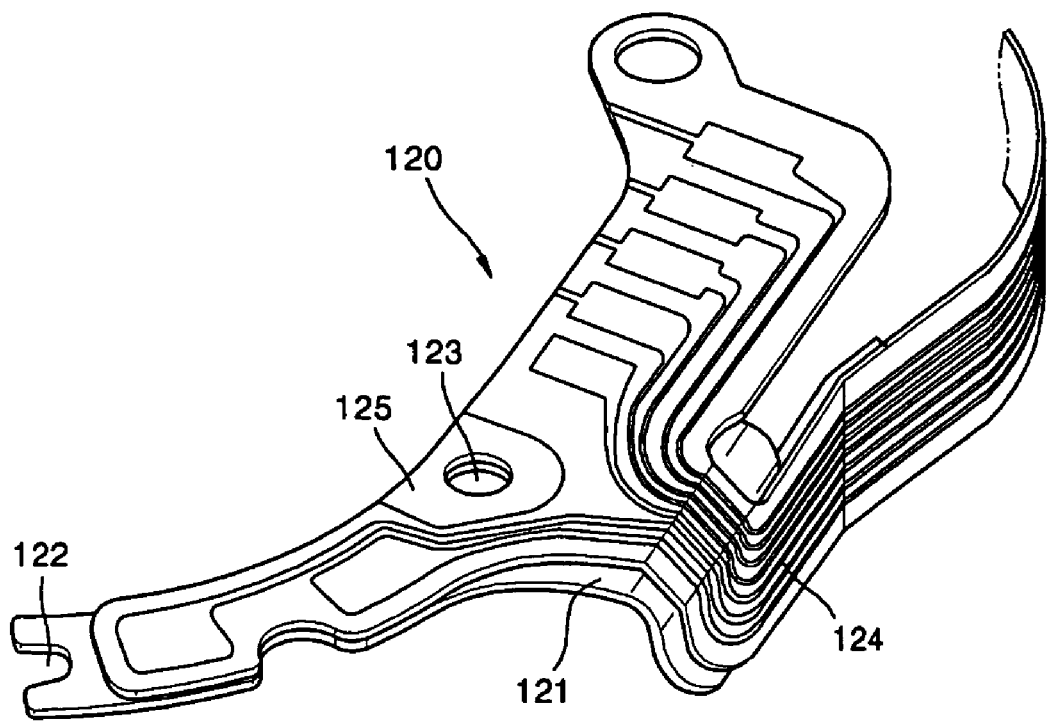
FIG. 6 illustrates a flexible printed circuit, such as that shown in FIG. 4, according to an embodiment of the present invention.

FIG. 4 illustrates a connecting of a flexible printed circuit and an actuator arm in an HDD, according to an embodiment of the present invention, FIG. 5 illustrates a molding of an actuator arm, such as that shown in FIG. 4, and FIG. 6 illustrates a flexible printed circuit, such as that shown in FIG. 4.

Referring to FIGS. 4 through 6, an actuator of an HDD may include an actuator arm 100, and the actuator arm 100 may have a pivot hole 114 formed at a center portion thereof so as to rotatably connect the actuator arm 100 to a pivot 101. As illustrated, a flexible printed circuit 120 may be connected to the actuator arm 100.

As an example, the actuator arm 100 may include a molding 110 formed through an over molding process where a VCM coil 111 can be installed, for example.

As illustrated in FIG. 5, a guide protrusion 112 and an alignment pin 113, which may connect the flexible printed circuit 120, may be formed in the molding 110, for example. The guide protrusion 112 may preferably be formed in a body with the molding 110 for simplicity in the manufacturing process, in this example. The alignment pin 113 may also be formed through an over molding process or a press-in process, for example. In order to increase the supporting force of the alignment pin 113, with respect to the connecting of the flexible printed circuit 120 and the actuator arm 100, the alignment pin 113 may preferably be formed in a body with the molding 110 through an over molding process, as still another example, noting that embodiments of the present invention are not limited to the above and alternative embodiments are equally available.

The flexible printed circuit 120 may include a flexible printed circuit 124 and a stiffener 121, installed below the circuit 124.

A soldering pad 125 may also be formed on the flexible printed circuit 124. Here, in this embodiment, the stiffener 121 may be made of stainless steel or polyimide, for example, to reinforce the flexible printed circuit 124 so as to prevent the flexible printed circuit 124 from buckling.

As illustrated in FIG. 6, a guide groove 122, into which the guide protrusion 112 can be fitted, may be formed at one end portion of the stiffener 121, and an alignment hole 123 into which the alignment pin 113 may be inserted can be formed along a center portion, for example, of the stiffener 121. As illustrated in FIGS. 5 and 6, the guide protrusion 112 and the guide groove 122 may be formed to have convex and concave shapes, respectively. Here, according to this embodiment, one side of the guide groove 122 may be open in the direction of the guide protrusion 112. The concave and convex shapes facilitate the alignment, or horizontal or slideable mating, of the actuator arm 100 and the flexible printed circuit 120, which will be described in greater detail below. Alternative embodiments are equally available to provide a guided meeting of a guide and a groove.

In addition, although the guide protrusion 112 may be formed along the molding 110 and the guide groove 122 may be formed along the flexible printed circuit 120, in the above embodiments, a guide groove may be formed along the molding 110 and a guide protrusion may be formed along the flexible printed circuit 120, as an example of another embodiment.

The connecting of the flexible printed circuit and the actuator will now be described in greater detail.

As illustrated in FIG. 4, guide protrusion 112 may be matched with the guide groove 122. Here, as illustrated in this embodiment, the guide groove 122 and the guide protrusion 112 are formed to have convex and concave shapes, respectively, such that the guide groove 122 has one side portion opened toward the guide protrusion 112, e.g., for horizontal or slideable mating. Accordingly, the guide protrusion 112 may be easily fit into the guide groove 122, such that the actuator arm 100 and the flexible printed circuit 120 can be easily aligned with each other. After this alignment, the alignment pin 113 may be inserted into the alignment hole 123, whereby the actuator arm 100 and the flexible printed circuit 120 are completely aligned.

Thereafter, the actuator arm 100 and the flexible printed circuit 120 may be fixed to each other by soldering the soldering pad 125 provided around the alignment hole 123 and the alignment pin 113.

According to an embodiment of the present invention, after the guide groove 122 and the guide protrusion 112 meet, and the alignment pin 113 is inserted in the alignment hole 123, the soldering pad 125 and the alignment pin 113 may be soldered together, whereby the flexible printed circuit 120 and the actuator arm 100 are fixed to each other. In this manner, the flexible printed circuit 120 and the actuator arm 100 can be easily aligned. Also, the flexible printed circuit 120 and the actuator arm 100 can be reliably connected through one soldering process. Accordingly, productivity can be increased in the connection process of the flexible printed circuit 120 and the actuator arm 100.

As stated above, according to embodiments of the present invention, the flexible printed circuit and the actuator arm can be easily aligned through a protrusion and a groove having an opened side portion to meet the protrusion. Also, the flexible printed circuit and the actuator arm can be reliably connected through one soldering process. Accordingly, productivity can be increased in the connecting process of the flexible printed circuit and the actuator.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hard disk drive, comprising:
   a flexible printed circuit comprising a stiffener, to support the flexible printed circuit, and a first guide having a recess; and
   an actuator, controlling rotatable movement of a read/write head, comprising a second guide to horizontally or slideably mate with the first guide,
   wherein, in addition to the horizontal or slideable mating of the first and second guides, an alignment hole and an alignment pin are also used to vertically mate the flexible printed circuit and the actuator,
   wherein the second guide has a protrusion to mate with the recess of the first guide and an end of the protrusion contacts the recess of the first guide.

2. The hard disk drive of claim 1, wherein the alignment hole and the alignment pin are fixed to each other with solder.

3. The hard disk drive of claim 1, wherein the alignment hole and the first guide, as a groove, are comprised in the stiffener.

4. The hard disk drive of claim 3, wherein the alignment hole is comprised along a central portion of the stiffener and the first guide is comprised along one end portion of the stiffener.

5. The hard disk drive of claim 1, wherein the alignment pin and the second guide, as a protrusion, are comprised in the actuator arm.

6. The hard disk drive of claim 1, wherein the actuator arm has a molding and the second guide, and the alignment pin are comprised in a body with the molding.

7. The hard disk drive of claim 1, wherein the alignment pin is formed within the actuator arm through a press-in process.

8. The hard disk drive of claim 1, wherein a soldering pad is provided around the alignment hole.

* * * * *